United States Patent Office 2,820,725
Patented Jan. 21, 1958

2,820,725

WELDING ALLOYS AND FLUXES

Rene D. Wasserman, Stamford, Conn., and Joseph Quaas, Island Park, N. Y., assignors to Eutectic Welding Alloys Corporation, Flushing, N. Y., a corporation of New York No Drawing. Application June 21, 1955
Serial No. 517,083

7 Claims. (Cl. 117—206)

This application is a continuation-in-part of copending application Serial No. 461,288, filed October 8, 1954, now abandoned, by this same inventor, and entitled Chrome-Manganese Alloys; and this invention relates to improved chrome-manganese alloys for application in gas and electric welding operations and to fluxes and coatings particularly adapted for application therewith. More particularly, the present invention relates to the discovery of an inexpensive and unusually low nickel bearing chrome alloy having properties rendering it suitable for application in substantially all commercial instances as a substitute for standard stainless chrome-nickel alloys.

As is well known, stainless steel alloys have enjoyed increasing application in various industries in recent years. The properties of these metals are such that in many instances suitable substitutes of equal or less expense have not been readily found. In addition, nickel, the essential constituent of the stainless alloys, has been classified as a critical material and is normally in short supply for general use. Numerous efforts have been made to compensate for the lack of sufficient nickel in commercial channels by devising substitute alloys possessing substantially the same desirable qualities. But none of these efforts have been successful in providing an inexpensive, general purpose alloy of suitable corrosion-resistant quality.

It now has been discovered that a stainless steel alloy can be formed so as to require no more than 4%, and in most instances substantially less, nickel and yet retain the essential characteristics of standard stainless chrome-nickel alloys. More specifically, the nickel content of stainless alloys can be materially reduced by substituting an unusually large amount of manganese and simultaneously adjusting the proportional ranges of the other constituents of a ferrous stainless alloy. In particular, a ferrous base alloy having qualities comparable with standard grade chrome-nickel alloys can be formed by employing less than 4% nickel with between 12 and 26% manganese and between 12 and 30% chromium.

One of the essential features of the invention is the fact that the composition of the chrome-manganese ferrous alloy can be altered to modify the physical structure in an as-deposited state which is directly analogous and substantially equivalent to those obtained with the wide range of high nickel bearing alloys now commercially available, such as the standard stainless chrome-nickel series.

Another feature of the invention is the obtaining of an alloy which can be applied by an oxy-acetylene or other gas torch technique or by an inert arc process without also requiring the conjoint use of a conventional flux. On the other hand, another facet of the invention is the provision of similar but distinct flux and protective compositions for application in torch and metal-arc operations employing the chrome-manganese alloy of the invention as a filler metal with excellent results.

Still another feature of this present invention is a relatively high silicon content, from 0.50 to 2.00%. This relatively high silicon content promotes fluidity of the molten alloy and allows deleterious oxides to rise to the surface of the weld metal. Presence of manganese oxides in welding filler materials high in manganese makes slag removal difficult and accordingly tends to form weld surfaces which are hard to clean. Enough silicon is, therefore, provided to cause manganese to form silicates rather than oxides. Formation of manganese silicates instead of manganese oxides concomitantly promotes easy slag removal and cleaner weld surfaces.

A further feature is the provision of a molybdenum content of from 0.0 to 4.0%. The presence of molybdenum even in these low percentages increases strength at elevated temperatures as well as enhancing resistance to specific corrosive media, particularly those media high in sulphur content. Fluidity of the molten weld metal is also promoted which is effective in producing a flat weld contour which presents a pleasing appearance. Other and distinct features will become apparent to those skilled in the art from the more detailed description of the invention which follows:

The novel alloy of the invention which is equally useful as a filler metal in both torch and inert metal arc applications can be formed with the stainless characteristics desired by compounding the constituents in the following proportions.

|  | Percent by weight | |
|---|---|---|
|  | Proportional range | Preferred comp. |
| Carbon | 0.02 to 0.49 | 0.11 |
| Manganese | 12.00 to 26.00 | 23.80 |
| Nickel | 0.10 to 4.00 | 0.90 |
| Chromium | 12.00 to 30.00 | 14.50 |
| Silicon | 0.50 to 2.00 | 1.20 |
| Molybdenum | 0.01 to 4.00 | 2.10 |
| Nitrogen | 0.05 to 0.35 | 0.25 |
| Iron | Balance | Balance |

The formation of the alloy is obtained by known foundry techniques in a manner standard in the art. It will be apparent to those skilled in the art that the range of constituents listed provides for the obtaining of variations in the deposited weldment which will range from fully austenitic through austenite-ferrite, austenitic-martensite, martensitic, martensite-ferrite and austenite-martensite-ferrite in dependence upon the degree of dilution and condition of the parent metal upon which the alloy is being applied. In particular, it will be obvious that the alloy can be so proportioned in its constituent ingredients as to obtain a weldment which is either ductile and soft, or hard and wear-resistant, and which characteristic will not be unduly modified by the specific application technique employed.

Alloys having excellent corrosion resistant properties and which in practice prove to be only slightly less effective than standard stainless chromium-nickel alloys can be made by maintaining the chemistry of the alloy as follows:

|  | Percent by weight | |
|---|---|---|
|  | Proportional range | Preferred comp. |
| Carbon | 0.05 to 0.10 | 0.06 |
| Manganese | 17.45 to 24.00 | 17.45 |
| Nickel | 0.50 to 1.07 | 1.07 |
| Chromium | 13.00 to 30.00 | 14.46 |
| Silicon | 0.50 to 0.71 | 0.71 |
| Molybdenum | 0.01 to 1.50 | 1.50 |
| Nitrogen | 0.10 to 0.25 | 0.23 |
| Iron | Balance | Balance |

On the other hand, alloys which harden with great rapidity and which exhibit excellent wear and abrasion resistance along with very good impact properties can be created by maintaining the chemistry of the metal as follows:

|  | Percent by weight | |
|---|---|---|
|  | Proportional range | Preferred comp. |
| Carbon | 0.07 to 0.65 | 0.62 |
| Manganese | 14.00 to 18.00 | 16.57 |
| Nickel | 0.50 to 2.00 | 1.02 |
| Chromium | 12.00 to 20.00 | 14.49 |
| Silicon | 0.50 to 2.00 | 1.10 |
| Molybdenum | 0.01 to 3.00 | 2.25 |
| Nitrogen | 0.10 to 0.30 | 0.25 |
| Iron | Balance | Balance |

One of the unusual features of the alloy of the invention resides in its ease of application in both oxy-acetylene and inert arc welding processes conducted without the usual fluxing composition. Apparently, this unusual property is attributable to the unusually high manganese content which imparts an unexcelled deoxidizing power and increases the fluidity of the molten filler metal while simultaneously supplying a sufficient amount of the oxide to properly flux and scavenge the weld metal surface. As a result, the alloy filler metal exhibits excellent flow, promoting a much more rapid bonding with a lower heat input than is obtained with higher nickel bearing alloys of the same general type.

A particularly effective alloy having a much desired high degree of ductility can be made by maintaining the chemistry of the metal as follows:

|  | Percent by weight | |
|---|---|---|
|  | Proportional range | Preferred comp. |
| Carbon | 0.04 to 0.12 | 0.05 |
| Manganese | 17.00 to 24.00 | 17.50 |
| Nickel | 1.00 to 3.00 | 1.45 |
| Chromium | 18.00 to 30.00 | 29.50 |
| Silicon | 0.50 to 0.70 | 0.65 |
| Molybdenum | 0.01 to 1.75 | 1.75 |
| Nitrogen | 0.15 to 0.30 | 0.20 |
| Iron | Balance | Balance |

Although the alloy of the invention is unique because of its ability to be employed as a bare core rod in an inert arc process in which the core itself supplies the filler metal, or alternatively, simply as an unfluxed filler metal in oxyacetylene and other arc welding processes, it has been discovered that superlative results can be obtained if a specially formulated flux is applied to the alloy core when it is used in torch applications, and a second modified form of flux coating is applied when the same is used in metal arc welding applications. Although it is preferred that the novel fluxes be applied as an adherent coating about the alloy, it will be readily understood that the same may be used in the form of a loose granular powder or as a paste, employing alcohol or water as the solvent or carrier. Preferably, when the flux is employed as a coating for the alloy core metal, it is wet-mixed with a water-soluble alkaline earth silicate and/or silicates, or in the alternative, with a low-melting point glass binder such as is disclosed in the copending application of Theodore I. Leston, S. N. 427,397, filed May 3, 1954. The coating is applied in the usual manner by dipping or extrusion.

For torch applications, such as an oxyacetylene process, it has been found that a lime-fluorspar base flux of the following composition provides excellent results:

|  | Parts by weight | | |
|---|---|---|---|
|  | Proportional range | Preferred formulation range | Preferred comp. |
| Calcium carbonate | 30 to 55 | 40 to 50 | 40 |
| Strontium carbonate | 5 to 10 | 5 to 7 | 7 |
| Calcium fluoride | 30 to 70 | 40 to 50 | 45 |
| Bentonite | 1 to 10 | 3 to 5 | 3 |
| Silica | 1 to 20 | 2 to 7 | 5 |

In particular, it has been noted that the calcium carbonate is most effective in lowering the melting point of the flux as well as in increasing its fluidity whereby the alloy filler metal is at all times wholly encased by a molten protective blanket. Substitution of calcium metasilicate for the calcium carbonate and silicate in approximately equal proportionate amounts can be made without departing from the scope of the invention. Likewise, small amounts of feldspar and/or aluminum silicate may be substituted in place of the silica without departing from the invention, the amount of feldspar and/or aluminum silicate preferably being maintained under two parts by weight. In some instances iron oxide additions, up to 15% by weight, have been included to provide for easier slag removal. One of the features of this innovation is apparently attributable to the combined or synergistic operation of the iron oxide and manganese oxide formed during the deposition which imparts a bright, clean appearance to the welding surface.

As heretofore indicated, although the novel alloy of the invention is capable of application without requiring the use of a flux, the instant coating is most beneficial where the welding operation is of long duration or is necessarily conducted at high welding temperatures, or alternatively, is controlled by a novice unskilled in the welding art.

For applications in which the alloy of the invention is employed as the core rod in a metal arc process, it has been found that the following flux coating provides excellent results, with any polarity, and in both A. C. and D. C. operations, the coating being compounded as follows:

|  | Parts by weight | |
|---|---|---|
|  | Proportional range | Preferred comp. |
| Titanium dioxide | 20 to 35 | 25 |
| Calcium fluoride | 5 to 15 | 6 |
| Calcium carbonate | 15 to 25 | 18 |
| Bentonite | 2 to 8 | 3 |
| Iron Oxide | 5 to 15 | 10 |
| Manganese Oxide | 2 to 12 | 8 |
| Calcium metasilicate | 5 to 15 | 8 |
| Aluminum oxide | 0.5 to 10 | 2 |
| Potassium titanate | 10 to 20 | 20 |

As previously indicated, water soluble alkaline silicates and/or a low-melting point glass binder is preferred as the bonding agent for adhering the coating to the alloy core wire. This coating composition is particularly effective for reducing the tenaciousness of the slag encountered when welding with the unfluxed alloy and in preventing over-deoxidation.

As many apparently widely different embodiments of this invention may be made without departing from the spirit and scope hereof, it is to be understood that this invention is not to be limited, except as defined in the appended claims.

What is claimed is:

1. A lime-fluorspar base flux for application with high manganese stainless, ferrous welding alloys in torch metal joining operations having the following composition, between 30 to 55 parts calcium carbonate, between 5 to 10 parts strontium carbonate, between 30 and 70 parts calcium fluoride, between 1 and 10 parts bentonite, and between 1 and 20 parts silica, all parts being by weight.

2. A lime-fluorspar base flux for application with high manganese stainless, ferrous welding alloys in torch metal joining operations having the following composition, from 40 to 50 parts by weight of calcium carbonate, from 5 to 7 parts by weight of strontium carbonate, from 40 to 50 parts by weight of calcium fluoride, from 3 to 5 parts by weight of bentonite, and from 2 to 7 parts by weight of silica.

3. A lime-fluorspar base flux for application with high manganese stainless, ferrous welding alloys in torch metal joining operations having the following composition, 40 parts by weight of calcium carbonate, 7 parts by weight of strontium carbonate, 45 parts by weight of calcium fluoride, 3 parts by weight of bentonite, and 5 parts by weight of silica.

4. A coating composition for use as a covering on high manganese stainless ferrous welding alloys useful in metal arc welding applications having the folowing composition, from 20 to 35 parts of titanium dioxide, from 5 to 15 parts of calcium fluoride, from 15 to 25 parts calcium carbonate, from 2 to 8 parts bentonite, from 5 to 15 parts iron oxide, from 2 to 12 parts manganese oxide, from 5 to 15 parts calcium metasilicate, from 0.5 to 10 parts aluminum oxide and from 10 to 20 parts potassium titanate, all parts being by weight.

5. A coating composition for use as a covering on high manganese stainless ferrous welding alloys useful in metal arc welding applications having the following composition, 25 parts titanium dioxide, 6 parts calcium fluoride, 18 parts calcium carbonate, 3 parts bentonite, 10 parts iron oxide, 8 parts manganese oxide, 8 parts calcium metasilicate, 2 parts aluminum oxide, and 20 parts potassium titanate, all parts being by weight.

6. A covered electrode having a conductive core and an overlying flux coating for use in metal arc welding applications in which the core has the following composition, between 0.02 and 0.49% of carbon, between 12.00 and 26.00% of magnanese, between 0.10 and 4.00% of nickel, between 12.00 and 30.00% of chromium, between 0.50 and 2.00% of silicon, between 0.01 and 4.00% of molybdenum, between 0.05 and 0.35% of nitrogen, the balance being iron, all percentages being by weight, and the coating has the following composition, from 20 to 35 parts titanium dioxide, from 5 to 15 parts calcium fluoride, from 15 to 25 parts calcium carbonate, from 2 to 8 parts bentonite, from 5 to 15 parts iron oxide, from 2 to 12 parts manganese oxide, from 5 to 15 parts calcium metasilicate, from 0.5 to 10 parts aluminum oxide, and from 10 to 20 parts potassium titanate, all parts being by weight.

7. A flux-bearing alloy filler metal for use in torch welding applications in which the alloy filler metal has the following composition, between 0.02 and 0.49% of carbon, between 12.00 and 26.00% of manganese, between 0.10 and 4.00% of nickel, between 12.00 and 30.00% of chromium, between 0.50 and 2.00% of silicon, between 0.01 and 4.00% of molybdenum, and between 0.05 and 0.35% of nitrogen, the balance being iron, all percentages being by weight, and the flux has the following composition, from 30 to 55 parts of calcium carbonate, from 5 to 10 parts of strontium carbonate, from 30 to 70 parts calcium fluoride, from 1 to 10 parts bentonite, from 1 to 20 parts silica, all parts being by weight.

References Cited in the file of this patent
UNITED STATES PATENTS

| | | |
|---|---|---|
| 2,179,258 | Howarth | Nov. 7, 1939 |
| 2,191,473 | Blumberg | Feb. 27, 1940 |
| 2,547,771 | Pessel | Apr. 3, 1951 |
| 2,548,690 | Vieno | Apr. 10, 1951 |
| 2,632,080 | Wasserman | Mar. 17, 1953 |
| 2,639,362 | Viles | May 19, 1953 |
| 2,657,130 | Jennings | Oct. 27, 1953 |
| 2,686,116 | Schempp | Aug. 10, 1954 |
| 2,698,785 | Jennings | Jan. 4, 1955 |